United States Patent
Wolske

[19]

[11] Patent Number: 6,062,013
[45] Date of Patent: May 16, 2000

[54] MULCHING MOWER WITH UNIFORM CUT AND PARTICULATE DISTRIBUTION

[76] Inventor: Eugene H. Wolske, 13528 Larkin Dr., Minnetonka, Minn. 55305

[21] Appl. No.: 09/166,014

[22] Filed: Oct. 2, 1998

[51] Int. Cl.⁷ .................................................. A01D 34/52
[52] U.S. Cl. .......................... 56/295; 56/255; 56/DIG. 20
[58] Field of Search .......................... 56/17.5, 255, 295, 56/DIG. 17, DIG. 20, 503, 504; 460/113

[56] References Cited

U.S. PATENT DOCUMENTS

| | | | |
|---|---|---|---|
| 2,663,984 | 12/1953 | Clark | 56/17.5 |
| 2,777,271 | 1/1957 | Sutton | 56/25.4 |
| 2,791,080 | 5/1957 | Shaw | 56/25.4 |
| 2,809,488 | 10/1957 | Sewell | 56/25.4 |
| 3,184,907 | 5/1965 | Harloff | 56/295 |
| 3,243,944 | 4/1966 | Michaud | 56/295 |
| 3,386,483 | 6/1968 | Waldrop et al. | 241/282.2 |
| 3,395,521 | 8/1968 | Crockett et al. | 56/295 |
| 3,399,519 | 9/1968 | Buchanan | 56/295 |
| 3,531,923 | 10/1970 | De Lay | 56/17.5 |
| 3,724,182 | 4/1973 | Long et al. | 56/10.4 |
| 4,143,823 | 3/1979 | Judson, Jr. | 241/73 |
| 4,189,903 | 2/1980 | Jackson et al. | 56/255 |
| 4,205,512 | 6/1980 | Thorud | 56/13.4 |
| 4,257,214 | 3/1981 | Ferguson et al. | 56/13.4 |
| 4,263,771 | 4/1981 | Iaboni et al. | 56/13.4 |
| 4,287,708 | 9/1981 | Neely, Jr. | 56/13.5 |
| 4,407,112 | 10/1983 | Shepherd et al. | 56/13.4 |
| 4,578,185 | 3/1986 | Wilson et al. | 210/85 |
| 4,916,887 | 4/1990 | Mullet et al. | 56/13.8 |
| 5,012,633 | 5/1991 | Ito et al. | 56/12.9 |
| 5,048,279 | 9/1991 | Badawey et al. | 56/320.2 |
| 5,056,605 | 10/1991 | Bond et al. | 172/111 |
| 5,070,683 | 12/1991 | Eggenmueller | 56/13.8 |
| 5,104,047 | 4/1992 | Simmons | 241/20 |
| 5,142,851 | 9/1992 | Lydy et al. | 56/13.4 |
| 5,209,052 | 5/1993 | Carroll | 56/DIG. 20 |
| 5,267,429 | 12/1993 | Kettler et al. | 56/295 |
| 5,271,212 | 12/1993 | Anderson | 56/12.7 |
| 5,293,735 | 3/1994 | Nascone | 56/255 |
| 5,305,589 | 4/1994 | Rodriguez et al. | 56/320.1 |
| 5,357,738 | 10/1994 | Griffiths | 56/17.4 |
| 5,363,635 | 11/1994 | White, III et al. | 56/255 |
| 5,457,947 | 10/1995 | Samejima et al. | 56/16.7 |
| 5,465,564 | 11/1995 | Koehn et al. | 56/320.2 |
| 5,485,715 | 1/1996 | Breeden | 56/13.3 |
| 5,499,495 | 3/1996 | Heisman et al. | 56/320.1 |
| 5,581,987 | 12/1996 | Schuyler | 56/255 |
| 5,669,213 | 9/1997 | Britton | 56/17.5 |
| 5,673,545 | 10/1997 | Friesen | 56/255 |
| 5,761,891 | 6/1998 | Ferrari | 56/6 |
| 5,765,346 | 6/1998 | Benter et al. | 56/2 |

FOREIGN PATENT DOCUMENTS 39730   1/1929   Denmark .................................. 56/294

OTHER PUBLICATIONS

Snapper Product Catalog, date unknown.
Ryerson Product Catalog, date unknown.
Reid Tool Supply Company, date unknown.

*Primary Examiner*—Thomas B. Will
*Assistant Examiner*—Ardad Fabian Kovacs
*Attorney, Agent, or Firm*—Vidas, Arrett & Steinkraus

[57] ABSTRACT

A mobile implement for mulching which provides complete control of the mulching process and uniformly distributes the mulch back upon the lawn. Grass and leaves are cut using a standard cutting blade. The mass of cut vegetation is then lifted upward into a hammermill by the trailing edge of the rotating cutting blade. The air stream generated by the rotating hammers of the hammermill forces the vegetation against a shear screen. Repeated blows by the hammers chop the vegetation to a controlled size and force it through the screen. A portion of the chopped mulch falls back upon the ground in the area of the trailing quadrant of the implement's path. The remainder of the mulch is forced into the discharge duct and blown uniformly out onto the lawn through the discharge opening of the mower housing. This same system of hardware may be incorporated into either a hand push or a power driven rotary mower as well as a gang unit, mounted on or pulled by a tractor.

24 Claims, 4 Drawing Sheets

MULCHING MOWER WITH UNIFORM CUT AND PARTICULATE DISTRIBUTION

BACKGROUND OF THE INVENTION

It is no longer ecologically acceptable to cut and mulch leaves and grass and truck them off to landfills. For the past decade municipalities have encouraged their residents to mow their lawn's frequently and allow the clippings to fall back onto the lawn and decompose naturally. This process, known as mulching, ceases to be effective if the lawn grows too long between successive mows. The effectiveness of mulching is also reduced in the fall when the leaves fall upon the lawn.

Nevertheless, it remains desirable to mulch vegetation to a fine texture and to uniformly spread the mulched vegetation back upon the lawn. By finely grinding the vegetation so as to form a mulch and uniformly spreading the mulch upon the resilient blades of grass, the likelihood of smothering the lawn is greatly reduced. Moreover, the uniformly cut and distributed mulch then functions as a natural organic fertilizer as it decomposes thus reducing the need for chemical fertilizers.

A number of different devices have been disclosed for mulching grass. Some of the devices merely plug the discharge chute and trap the chopped vegetation in the mower housing until it falls back upon the ground. The distribution of the mulch is uneven and often results in clumps of material scattered over the lawn.

Other devices post process the cut leaves and grass as they exit the discharge of the cutting deck or the hopper of a trailer.

Some devices utilize exotic blade designs which deflect the flow of material up and down in hopes of achieving uniformity.

None of these approaches provide the same degree of control in a simple, compact machine.

To that end, the present invention is directed to a mobile implement for reducing vegetation to dispersible size. More particularly, it is directed to a mulching mower which mulches vegetation and uniformly distributes mulch back onto the lawn.

SUMMARY OF THE INVENTION

A mobile implement for reducing vegetation in size is disclosed which includes a rotating arm, one or both ends of which terminate in a hammer and a cylindrical shear screen. The hammer(s) and shear screen are constructed and arranged so as to cooperate to reduce vegetation in size. The rotating arm is rotatably connected to a rotor emanating from a drive means. The shear screen is contained within the implement housing and disposed about the rotor. A discharge opening is present in the housing to allow for discharge of the vegetation.

In accordance with the invention, vegetation is believed to be reduced in size by being forced through the shear screen by the air flow generated by the rotation of the hammers in addition to the shearing of the vegetation caused by the hammers sweeping the shear screen.

The implement may further comprise additional arms rotatably connected to the rotor and terminating in hammers to assist in further reducing vegetation in size.

Desirably, the implement will also include a cutting blade which is rotatably connected to the rotor and mounted below the rotating arm for cutting of vegetation.

Finally, the inventive implement may further have a discharge duct disposed about the shear screen. The discharge duct terminates in the discharge opening. The duct may be formed of a lower plate, the shear screen and a portion of the housing surrounding the shear screen and the lower plate. The lower plate extends radially outward from at least a portion of the bottom of the shear screen in a plane parallel to the plane of rotation of the at least one arm.

Desirably, at least a portion of the discharge duct is open on the bottom in the region of the discharge opening in the housing.

While the inventive implement may be used for a wide variety of purposes, it finds special application for use as a mulching mower.

In a preferred embodiment, the invention is directed to a mulching mower comprising a housing containing at least a portion of a drive means with a rotor extending therefrom, a blade rotatably connected to the rotor and a hammermill. The hammermill, concentrically mounted about the rotor within the housing, comprises one or more hammers extending from an arm rotatably connected to the rotor and a shear screen. Already cut vegetation is driven through the shear screen for further reduction in size. Desirably, the mower further comprises a discharge duct disposed about the shear screen. Vegetation that has been reduced in size is directed via the discharge duct to a discharge opening in the housing. A portion of the bottom of the duct may be open.

In yet another embodiment, the invention is directed to a kit for converting a rotary mower into a mulching mower. The kit comprises a shear screen adapted to be affixed to the inside of a mower housing and further contains one or more arms mountable on the rotor of the mower. Desirably, each arm terminates in a hammer. More desirably, each end of each arm terminates in a hammer. The arms are rotatably connected to the rotor of the mower between the cutting blade of the mower and the drive means so that the arms are rotating further off the ground than the cutting blade.

The invention is also directed to lawnmowers having horizontally oriented, bottom fed hammermills for chopping of vegetation or otherwise reducing in size of vegetation. In its simplest form, the lawnmower comprises a body portion, a drive means having a rotor emanating therefrom and a horizontally disposed, bottom fed hammermill rotatably connected to the rotor and secured to the body. The drive means is secured to the body portion. Desirably, the horizontally oriented hammermill is situated within a lawn mower housing above a cutting blade of the mower. As the grass and other vegetation is cut, it is thrown upward by the cutting blade and the air currents within the housing where it is then taken in by the hammermill and chopped to a finer size or otherwise further reduced in size for the purpose of mulching. As in the above embodiments, the mower may further comprise a discharge duct.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1A:
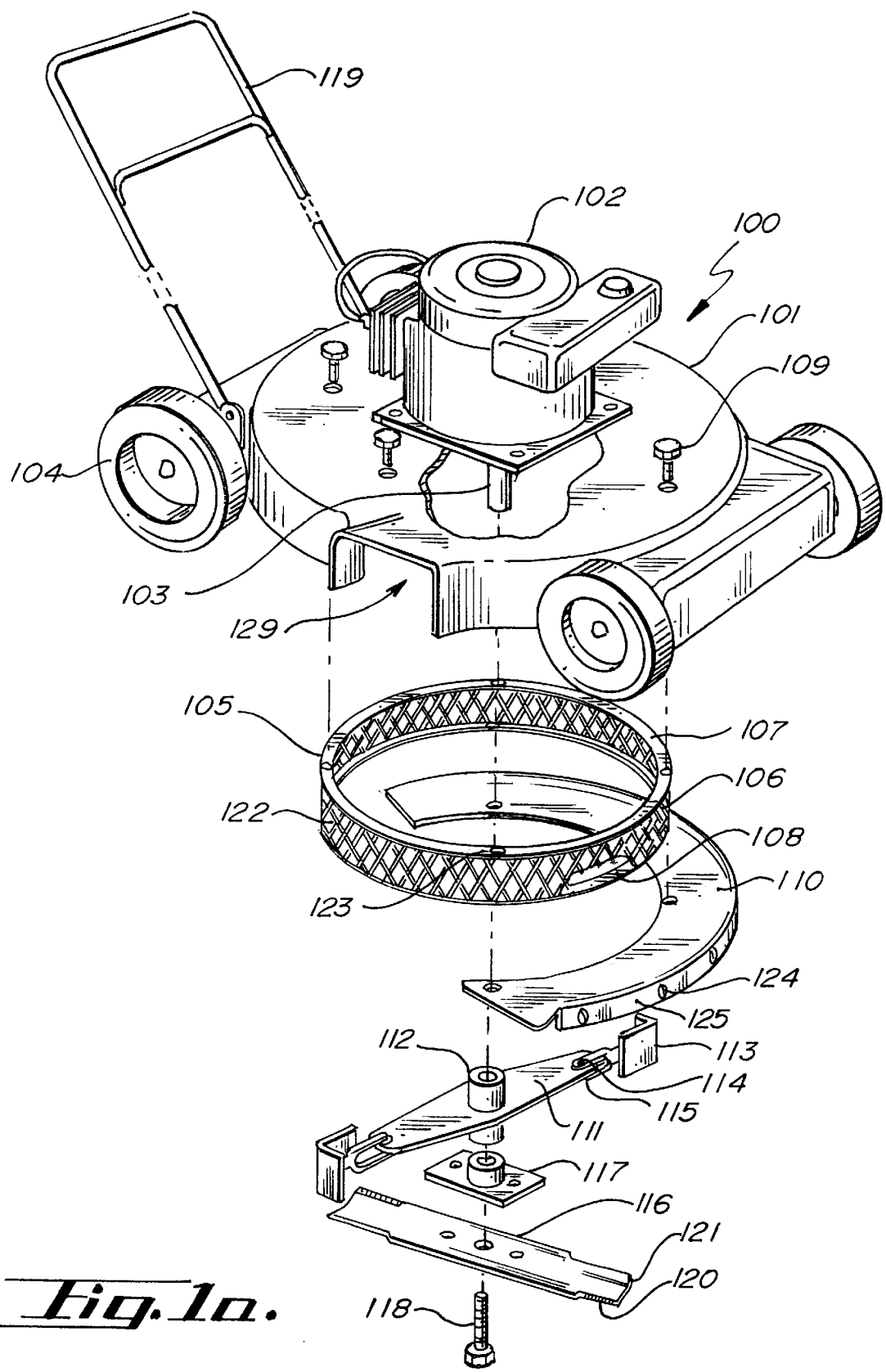
FIG. 1a shows a perspective view of an inventive mulching mower with major components shown exploded.

In FIG. 1a an inventive walk behind lawn mower is shown generally at 100. The mower includes a rigid housing 101 which supports a gasoline engine 102. The whole machine is supported on wheels 104 of adequate size to roll freely over the ground. A handle 119 is connected to mower housing 101 to facilitate the pushing and steering of the unit. The invention may be applied to ride-on and self-propelled mowers as well.

Figure 3:
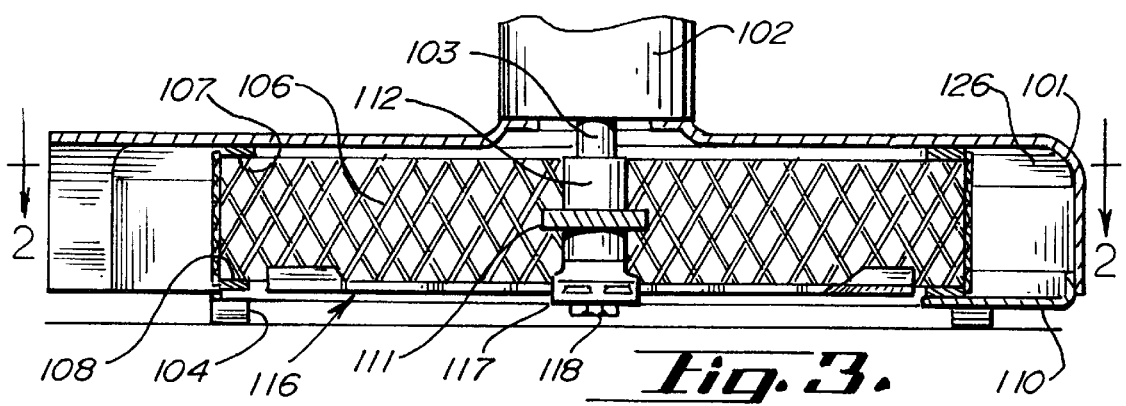
FIG. 3 shows a front view sectioned at 3—3 of top view of FIG. 2.
Figure 2:
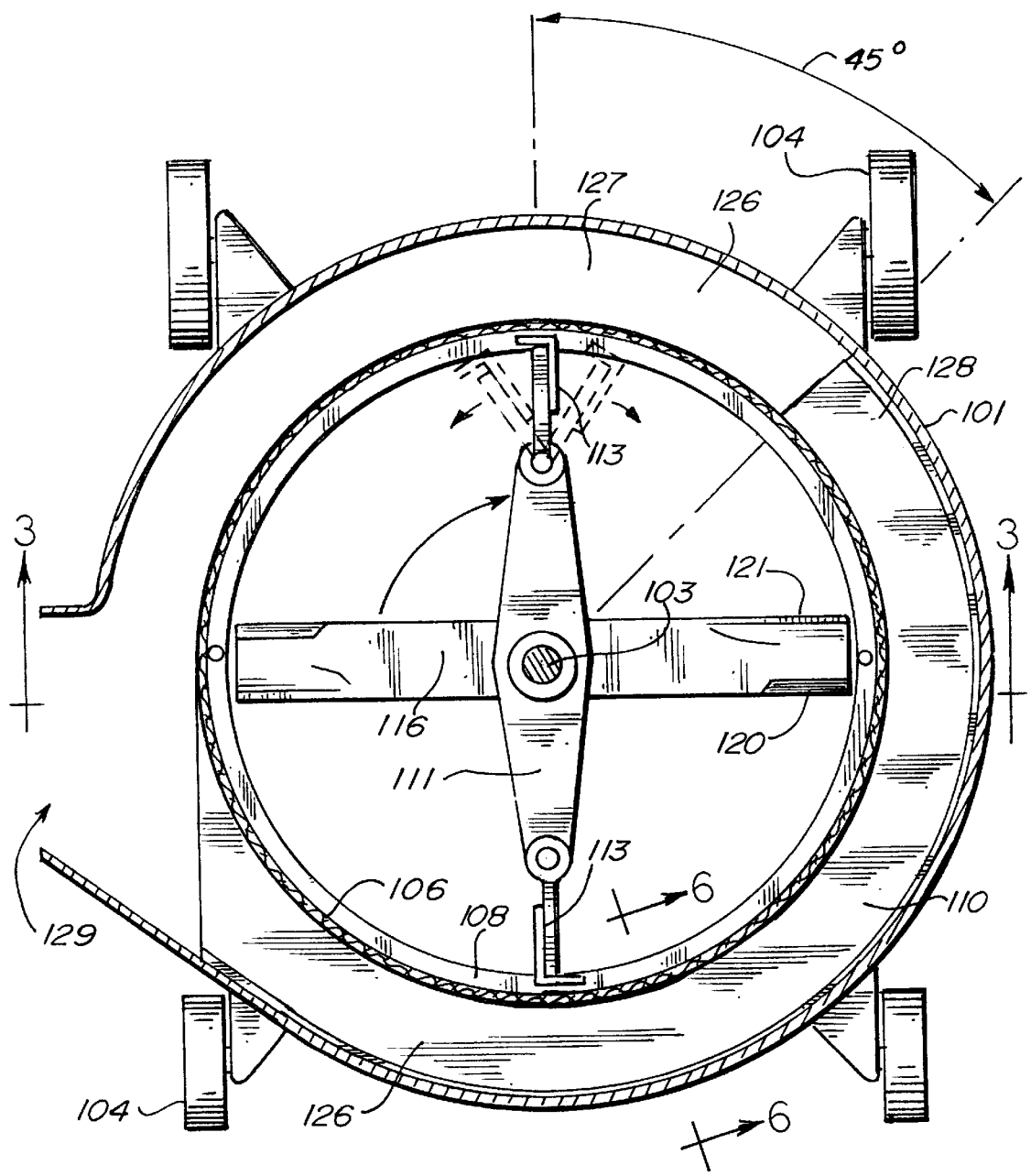
FIG. 2 shows a top view of mower assembly sectioned at 2—2 of FIG. 3.

The inventive mower further comprises a shear screen assembly 105 which consists of an upper ring 107 and a lower member 108. Both are rigidly attached to screen 106. Screen 106 is desirably made of a material with a large percentage of open area. One such commercially available material is flattened expanded metal mesh. If oriented with the long dimension of the openings in the horizontal plane, the long tapered openings 122 shear the leaves and grass with a minimum amount of energy. The size of the opening can be changed by replacing screen assembly 105. Smaller openings result in finer cut mulch. Punched flat metal may also be utilized as the screen material 106. Regardless of the screen material used, a large percentage of open area relative to screen material is desirable to permit maximum air flow through the screen so as to propel the chopped mulch out discharge duct 126 as seen in FIGS. 2 and 3. Upper reinforcing ring 107 contains several tapped holes 123 for rigidly mounting assembly 105 to mower body 101 with bolts 109. Lower reinforcing member 108 also contains tapped holes 124 to secure the inner flange 125 of lower plate 110 of the discharge duct 126. The upper surfaces of the discharge duct are an integral part of mower housing 101.

Rotor 111 is rigidly mounted to engine output shaft 103. Hub 112 is keyed to shaft 103 to transfer the torque from engine 102 to rotor 111. Hub 112 is welded to arm 111. Mounted at each end is a pivotally attached hammer—fan blade 113. These hammers 113 have two functions. First, they function as fan blades by virtue of the substantial amount of surface area. Second, with the sharp outer edge rotating in close proximity to the screen openings, they also function as one half of a shear assembly. Each hammer 113 is attached with a shoulder pin 114 and secures with a cotter pin 115 or equivalent locking ring or the like. This rotor assembly (parts 111, 112, 113, 114 and 115) is positioned on the horizontal centerline of shear screen assembly 105.

Desirably, there will only be a small clearance if any between the hammers and the shear screen. Preferably, the clearance will be less than 0.050 of an inch and clearances as small as 0.003 of an inch or smaller would be preferable. While clearances may be in excess of 0.050 of an inch, as the clearance increases, the efficiency of the shearing decreases. Moreover, with increased clearances, the possibility of sticks or other debris becoming lodged between the hammers and the shear screen increases.

Mounted at the lower end of output shaft 103 is the blade attaching hub 117 and, beneath that, mower blade 116, as seen in FIG. 1a. Typically hub 117 contains a woodruf key of adequate size to transfer the necessary torque. Both mower blade 116 and hub 117 are secured in position on the shaft by threaded fastener 118. Blade 116 is preferably symmetrical about the centerline of it's width. The leading edge 120 at each end is sharpened to cut the leaves and grass as it rotates at engine speed. The trailing edge 121 of each end of blade 116 is bent up desirably at an angle of about 10 degrees to about 30 degrees. This angle lifts the cut material up into the air flow caused by rotating hammers 113. It has been determined that cutting blade 116 should be phased about 90 degrees in the horizontal plane ahead of hammer 113 to optimize the flow of material—leaves and grass— against the shear screen 106. Upon making a large diameter machine, it may be desirable to substitute a blade with three or more cutting edges with each cutting edge followed by an angled trailing edge to lift the cut material. For each cutting edge 120, there is preferably one hammer assembly (113, 114, and 115). Each hammer assembly preferably is positioned an equal distance (arc length) between successive cutting edges 120.

During seasons when the primary use of the mower is merely to cut the grass, shear screen assembly 105, lower plate 110 and rotor assembly (111, 112, 113, 114, and 115) may optionally all be removed. Blade 120 would be replaced with a longer blade of similar design which would be reattached to the lower end of output shaft 103 utilizing hub 117 and bolt 118.

The cutting blade is desirably positioned flush with the bottom edge of the shear screen, as shown in FIG. 3, and trimmed to length to provide clearance at each end. Desirably, there will be a clearance of from about 1/16 of an inch to 1/4 of an inch at each end.

Although the inventive mower may employ a standard rotary lawn mowing blade such as a blade with a sharpened leading edge at each end and an angled trailing edge so as to lift the cut material into the mower housing to be further dispersed by the air flow generated by the pivoted blades/ hammers rotating at engine speed, other blades as are known in the art may also be used in the practice of the present invention.

The hammers, although depicted in the figures as pivotally connected to the arm, may also be non-pivotally connected to the arm, Similarly, the hammers may be formed integrally with the arm from one piece of metal or other suitable material. While it is desirable that the arm assembly be phased 60 to 90 degrees behind the cutting blade, and more desirably, about 90 degrees behind the cutting blade, it is within the realm of the invention for the arm assembly to be mounted on the rotor at some other angle relative to the cutting blade.

Desirably, as the hammers/blades rotate at engine speed, the radial component of the air velocity passing through the screen will force some of the chopped vegetation particles through the screen. The vegetation is further reduced in size as the hammer traverses the screen and grinds the vegetation. Of course the vegetation may be also be reduced in size by the hammermill through cutting, chopping, shredding, pulverizing and other action depending on the specific design of the hammers and shear screen.

Figure 1B:
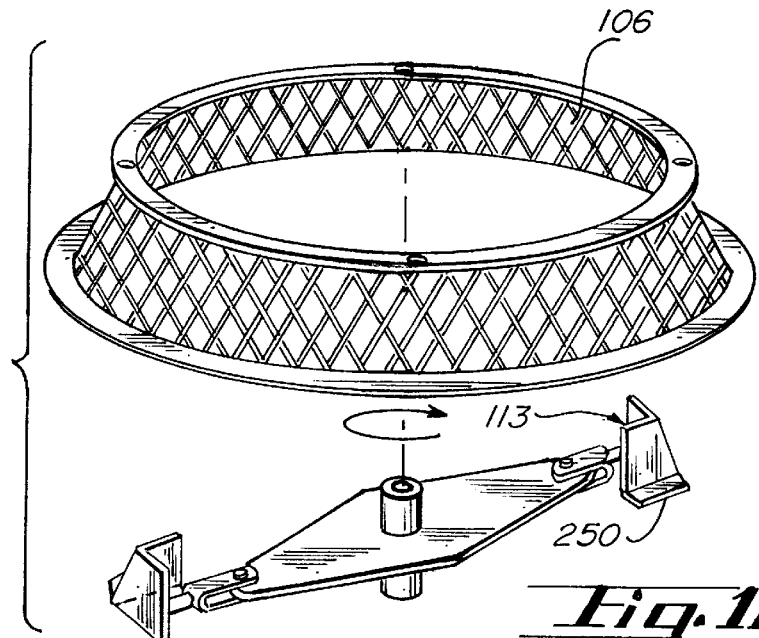
FIG. 1b shows an alternative shear screen and hammers that may be used in accordance with the invention.

Shear screen 106, as shown in the figures, takes the shape of a large diameter short cylinder. The cylinder may be characterized by a circular cross section, though cylinders with other cross-sectional shapes may be used as well, such as cylinders with eccentric cross sections. Those of ordinary skill in the art will recognize the possibility of altering the cylinder shape from circular to some other suitable shape as dictated by the overall design of the mower. The shear screen may also be frustoconical in shape as shown at 106 in FIG. 1b. Where a frustoconical shear screen is used, hammers 113 will be suitably tapered. The bottom edge of hammer 113 may optionally terminate in a cutting edge or surface 250.

Shear screen 106 is optionally reinforced at both top and bottom edges with rigid rings 107 and 108. It is positioned concentric to the output shaft of the engine and rigidly attached to the mower housing. The opening size of the screen can be varied to control cut size. While openings of less than one and a half inches are desirable, larger openings may also be used. Larger openings may prove particularly useful where large pieces of vegetation are being reduced in size. For the sake of clarity, the abovementioned length of the shear screen opening is measured across the shortest path across the opening. Thus for shear screen 106, the opening is measured across the short way of the diamond. There is a trade-off between structural integrity, cost and open area (venting capacity). ¾ inch×13 gauge flattened expanded steel, a readily available screen material, is particularly suitable for use in the shear screen although ½ inch and ¼ inch openings may also be used. Of course, if the opening is too small, the screen is likely to clog. Although shear screen 106 is shown with diamond shaped openings the long dimension of which is oriented in the horizontal plane, the long dimension may also be oriented in the vertical plane or at an oblique angle relative to the horizontal plane. Furthermore, screens with other shaped openings including rectangular, round, square, polygonal and oval openings as well as any other suitable openings as are known in the art may also be used.

In addition to steel, other suitable materials for the shear screen include bronze, titanium, and aluminum alloys. Desirably, the shear screen will be made of an abrasion resistant material.

It will be recognized by those of ordinary skill in the art that the term 'shear screen' as used herein also includes perforated sheets and plates. The term 'shear screen' is further intended to include devices that operate in a manner similar to shear screens. One such device consists of two rigid rings with a plurality of rods extending therebetween. The spaces between the rods correspond to the openings in the screen. Desirably, the rods will have sharpened edges and will present a flat face to the hammers.

Discharge duct 126 provides a channel to transport the chopped mulch while preventing the high velocity air flow from disturbing the uncut surrounding leaves and grass. While the discharge duct may be closed, desirably a portion 127 of discharge duct 126 is open to the ground allowing approximately half of the mulched material to fall back upon the ground. This open portion is desirably located behind and to the discharge side of the mower's cut path. Also, desirably, the open portion of the discharge duct will subtend an angle of from about 45 degrees to about 135 degrees about the rotor as shown in FIG. 2. Also as shown in FIG. 2, the open portion of the discharge duct is desirably in the trailing quadrant of the mower's path. The remainder 128 of the discharge duct—i.e. the closed portion of the discharge duct—contains the mulched product within until it is propelled out through the discharge port 129 of the mower.

The discharge duct may be formed from the shear screen 106, a portion of the housing 101 surrounding the shear screen and the lower plate 110.

Figure 4:
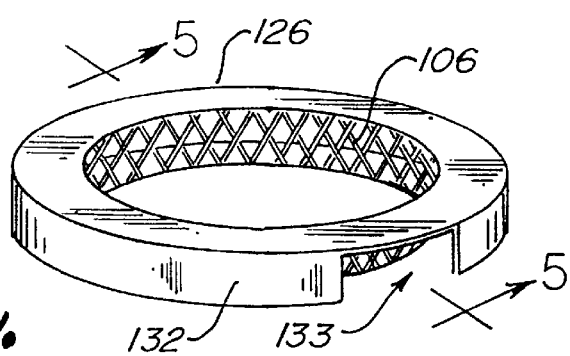
FIG. 4 shows a discharge duct and shear screen assembly for use with the inventive mower.
Figure 5:
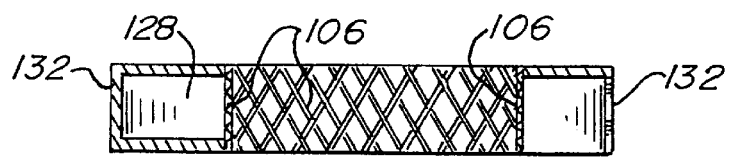
FIG. 5 shows a view of FIG. 4 sectioned at 5—5.

Alternatively, the discharge duct may be formed as a single unit with the shear screen. One such embodiment is shown generally at 126 in FIG. 4. Shear screen 106 forms the inner wall of duct 126. Outer wall 132 of duct 126 has an opening 133 therein which is aligned with the discharge port in the mower. Desirably, a portion of the bottom of the duct is open. A transverse cross section of the duct is shown in FIG. 5 which includes a portion 128 of the duct which is closed as well as a portion 127 of the duct which is open on the bottom.

Figure 6A:
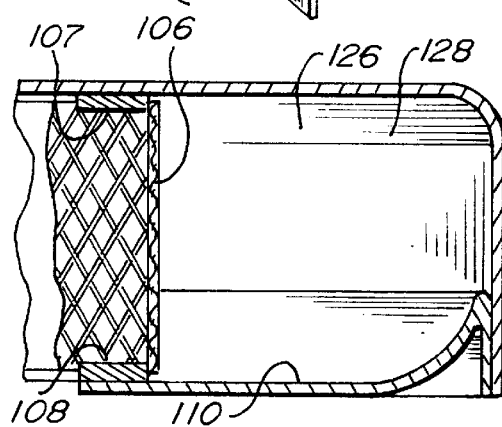
FIGS. 6a and 6b show a view of FIG. 2 sectioned at 6—6.
Figure 6B:
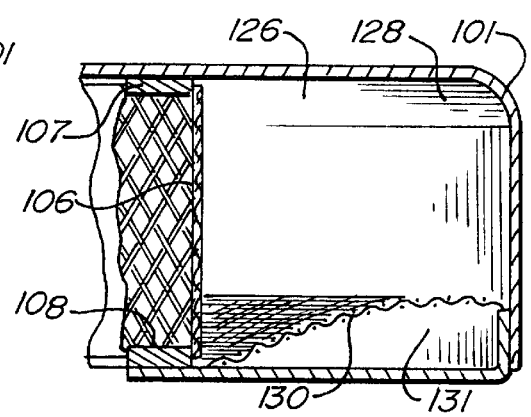

The internal surface of discharge duct desirably has a smooth, low friction surface as depicted in FIG. 6a. The interior surface may desirably having a Teflon or other non-stick coating thereon or may be formed of Teflon or other non-stick materials. Other surface and coatings as are known in the art may also be employed. To accommodate the mulching of damp or wet grasses and leaves, the inner surface could be replaced with an air slide 130 as shown in FIG. 6b. The air slide may be formed of an air slide or porous fabric such as canvas or of a perforated metal. In this case an auxiliary blower (not shown) would be required to provide the fluidizing air to the pressure manifold 131. The pressurized air then flows through the air slide material to provide a bed of air on which the mulched material may be carried on its way to discharge port 129. The auxiliary blower may be driven by the engine of the mower. An auxiliary blower may also be used to inject additional high velocity conveying air for facilitating discharge even in the absence of the air slide.

The upper surface and the outer surface of the discharge duct, though desirably formed of a portion of the inner surface of the mower housing, may also be separate from the mower housing.

In addition to attaching bottom plate to the mower by screws, as discussed above, it would also be desirable for the bottom plate to be easily disconnected and removed for cleaning in the event of plugging of the discharge duct. To that end, any suitable method of attachment of the lower plate may be used in the practice of the invention. In particular, it is desirable for the bottom plate to be clipped in place via one or more fastening members such as screws, bolts, clips, draw latches including over center draw latches, resilient latches, other releasable fasteners or other suitable attachment means, as are know in the art. The fastening members are preferably easy to remove to facilitate cleaning the duct and yet difficult to accidentally dislodge when the mower is in use.

Similarly, the shear screen assembly may also desirably be fastened to the housing with other fastening members such as easily removable clips.

It is desirable that the inventive mower be readily convertible back to a conventional rotary lawn mower with minimal effort by removing several key components and optionally replacing the cut blade with a full length blade. To effect such a conversion, the following items must be removed from the mower:

a. Isolating discharge duct.
 b. Shear screen assembly.
 c. Arm assembly with hammers.
 d. Shortcut blade.

Upon removal of these components and replacement of the shortened blade with a longer blade, the mower may be used for conventional non-mulching applications. Although the short cut blade need not be replaced, it is desirable in converting from mulching applications to non-mulching applications to substitute a longer cut blade because the mower, absent the shear screen assembly and discharge assembly can accommodate a longer cutting blade.

The invention further relates to a kit for converting a rotary mower into a mulching mower. The kit comprises the above components, namely a shear screen assembly adapted to be affixed to the housing of the mower, a lower plate so as to form a discharge duct, an arm assembly optionally with hammers and a short cut blade. Desirably, a shear screen which is formed integrally with a duct, as shown in FIG. 4, may be used. A portion of the duct is desirably open on the bottom.

Although the invention has been described in relation to a single blade hand push mower, it becomes apparent that it could be utilized on power driven machines as well as riding type mowers with multi-blade or gang units and tractor based mowing units, mounted on, suspended on or pulled by a tractor. Such machines may be modified by placing one or more hammermills above the cutting blades of the mower. The hammers of the hammermills may be driven by the same drive means as the cutting blades of the mower. For improved efficiency, the housing may be suitably arranged with one or more discharge ducts, desirably with a discharge corresponding to each hammermill.

Also within the scope of the invention are mowers with more than one cutting blade, as are known in the art. Similarly, the inclusion of more than one arm terminating in hammers is contemplated.

Further, while the invention has been described as having wheels, in a more general sense, the inventive mower may have a wheel means supporting the housing for movement over a supporting surface such as grass. Suitable wheel means includes wheels and caterpillar treads such as those found on tractors and tanks. Moreover, a wheelless embodiment of the inventive mower is also contemplated. The wheelless embodiment floats on a cushion of air produced by the mower, as known in the art.

Figure 7:
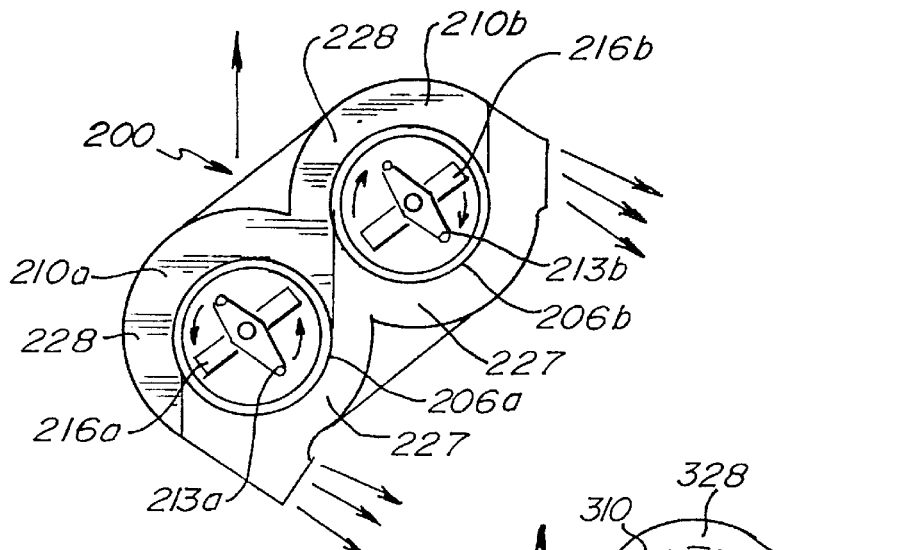
FIG. 7 shows a top view of a lower portion of a two bladed counter-rotating embodiment of the inventive mower.

FIG. 7 shows a top section view of a two blade counter-rotating version of the inventive mower, shown generally at 200. Mower blades 216a and 216b rotate in opposite directions from one another. Hammer blades 213a and 213b are mounted above mower blades 216a and 216b respectively and further cut and direct vegetation through shear screens 206a and 206b respectively. Also shown in the figure are the lower plates 210a and 210b of the discharge ducts associated with each cutting unit. As with the single unit mower, lower plates 210 do not extend across the entire bottom portion of the mower but rather a portion of the discharge duct 227 is open to the ground and a portion 228 is closed. Although the embodiment shown in FIG. 7 has counter-rotating mowing units, the invention contemplates the possibility of the individual units rotating in the same direction.

Figure 8:
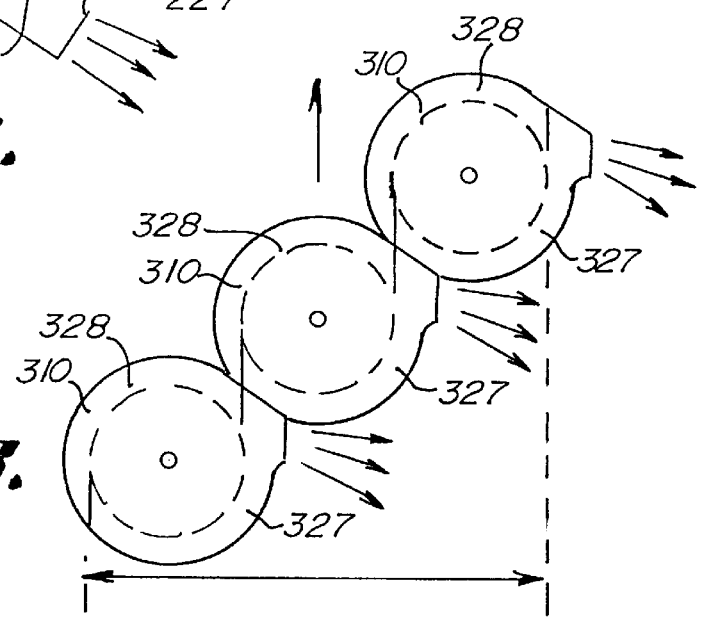
FIG. 8 shows a schematic top view of a gang mower.

A example of a multi-unit mower with blades all rotating in the same direction is shown generally in FIG. 8 at 300. FIG. 8 depicts a schematic of a gang mower with three units. Each of the individual units may contain a shear screen or shear screen and hammer blade as disclosed above. Again, as with the single unit mower, lower plates 310 do not extend across the entire bottom portion of the mower but rather a portion of the discharge duct 327 is open to the ground and a portion 328 is closed.

The inventive mower, though shown with a gasoline engine in the figures, may contain any other suitable drive means for driving the cutting blade and hammer blade including an electric motor. The drive means may further comprise v-belts, drive shafts and/or gear boxes.

Although typically the inventive implements will be directed to mulching vegetation such as grass and leaves, the inventive implements may also be used for reducing other types of vegetation in size including agricultural vegetation such as corn stalks, stubble and any other crop remains.

Finally, the invention is directed to a method of mulching vegetation. The method comprises the step of providing a mower with a rotary cutting blade therein, the rotary cutting blade rotating in a cutting plane, the mower further comprising a hammermill. The hammermill comprises a shear screen and preferably an arm which rotates in a plane parallel to the cutting plane. Desirably, the arm has hammers extending therefrom. The method further comprises the step of cutting the vegetation with the rotary cutting blade of the mower so as to form clippings. The clippings are directed upward into the hammermill. Finally, the method comprises the steps of pulverizing the clippings into a mulch with the hammermill and discharging the mulch from the mower. The method may be practiced using any of the inventive implements disclosed herein.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A mobile implement for reducing vegetation in size on a supporting surface comprising:

a housing;

a discharge opening in the housing for discharging vegetation reduced in size therefrom;

a drive means, at least a portion of the drive means contained within the housing;

a rotor extending from the drive means;

at least one arm connected to the rotor for rotation therewith, the at least one arm rotating within the housing in a plane generally parallel to said supporting surface;

at least one hammer extending from the arm;

a cylindrical shear screen having openings therein, the shear screen mounted within the housing in a plane substantially parallel to the plane of rotation of the arm, the surface of the shear screen perpendicular to the plane of rotation of the arm, the shear screen disposed about the arm and hammer, the hammer including a surface facing the shear screen and perpendicular to the arm;

the at least one hammer and shear screen constructed and arranged so as to cooperate to reduce vegetation in size therebetween; and a cutting blade connected to the rotor below the at least one arm, the cutting blade rotating within the housing in a plane generally parallel to said supporting surface.

2. The implement of claim 1 wherein each end of the at least one arm terminates in a hammer.

3. The implement of claim 1 wherein the at least one hammer is pivotally mounted on the at least one arm.

4. The implement of claim 1 wherein the arm has one or more sharpened surfaces for cutting vegetation.

5. The implement of claim 1 wherein the at least one arm is about 90° out phase with the blade.

6. The implement of claim 1 wherein the shear screen is made of a material selected from the group consisting of steel, bronze, titanium, and aluminum alloys.

7. The implement of claim 1 wherein the openings in the shear screen are about 1.5 inches or smaller.

8. The implement of claim 1 further comprising a discharge duct disposed about the shear screen, the discharge duct terminating in the discharge opening.

9. The implement of claim 8 wherein the discharge duct is closed on the bottom.

10. The implement of claim 1 further comprising
   a lower plate extending radially outward from at least a portion of the bottom of the shear screen in a plane parallel to the plane of rotation of the at least one arm, and
   a discharge duct disposed about the shear screen, the discharge duct terminating in the discharge opening, the discharge duct formed, at least in part, from the shear screen, a portion of the housing surrounding the shear screen and the lower plate.

11. The implement of claim 10 wherein at least a portion of the discharge duct is open on the bottom in the region of the discharge opening in the housing.

12. The implement of claim 11 wherein the open portion of the discharge duct subtends an angle up to about 135 degrees about the rotor.

13. The implement of claim 1 wherein the shear screen further comprises a connecting member for attaching the shear screen to the housing.

14. The implement of claim 1 further comprising a wheel means supporting the housing for movement over a supporting surface.

15. A mobile implement for reducing vegetation in size on a supporting surface comprising:
   a housing;
   a discharge opening in the housing for discharging vegetation reduced in size therefrom;
   a drive means, at least a portion of the drive means contained within the housing;
   a rotor extending from the drive means;
   at least one arm connected to the rotor,
   the at least one arm rotating within the housing in a plane generally parallel to said supporting surface;
   at least one hammer extending from the arm;
   a cylindrical shear screen having openings therein, the shear screen mounted within the housing in a plane substantially parallel to the plane of rotation of the arm, the surface of the shear screen perpendicular to the plane of rotation of the arm, the shear screen disposed about the arm and hammer, the hammer including a surface facing the shear screen and perpendicular to the arm, the at least one hammer and shear screen constructed and arranged so as to cooperate to reduce vegetation in size therebetween, the shear screen further comprises a connecting member for attaching the shear screen to the housing wherein the connecting member is a ring extending from the top of the screen and coplanar with the top of the screen, the ring having a plurality of openings therein to accommodate a fastening member.

16. A mulching mower comprising:
   a housing;
   a discharge opening within the housing for discharging vegetation therefrom;
   a drive means, at least a portion of the drive means contained within the housing;
   a rotor extending from the drive means and contained within the housing;
   a cutting blade connected to the rotor for cutting vegetation, the cutting blade rotating with the rotor; and
   a hammermill for reducing in size vegetation cut by the cutting blade, the hammermill comprising an arm with one or more hammers extending therefrom, the arm connected to the rotor above the blade, the arm rotating with the rotor, and a shear screen, the shear screen concentrically mounted about the rotor within the housing.

17. The mulching mower of claim 16 further comprising a discharge duct terminating in the discharge opening, the discharge duct disposed about the shear screen.

18. The mulching mower of claim 17 wherein at least a portion of the discharge duct is open on the bottom.

19. The mulching mower of claim 16 wherein each end of the arm terminates in a hammer.

20. The mulching mower of claim 16 wherein the shear screen is frustoconical.

21. The mulching mower of claim 16 wherein the hammer and shear screen are constructed and arranged to reduce vegetation in size.

22. A mulching mower for mowing ground based vegetation, the mower comprising:
   a body portion;
   a drive means attached to the body portion;
   a rotor emanating from the drive means;
   a horizontally disposed, bottom fed hammermill comprising
      a shear screen disposed about the rotor and secured to the body,
      an arm connected to the rotor for rotation therewith and
      at least one hammer, the hammer including a surface extending at an oblique angle from an end of the arm and substantially parallel to a portion of the shear screen, and
   a cutting blade, the cutting blade mounted to the rotor below the arm for rotation therewith.

23. The mower of claim 22 further comprising a discharge duct disposed about the shear screen, the shear screen forming an interior wall of the discharge duct, the discharge duct constructed and arranged to convey mulched vegetation to a single discharge opening in the housing.

24. A method for preparing mulch from vegetation comprising the steps of:
   providing a mower with a rotor therein, a rotary cutting blade connected to the rotor, the rotary cutting blade rotating in a cutting plane, the mower further comprising a hammermill, the hammermill comprising a shear screen and an arm with hammers extending therefrom, the arm rotating in a plane parallel to and above the cutting plane, the arm connected to the rotor;
   cutting the vegetation with the rotary cutting blade of the mower whereby clippings are formed;
   directing the clippings upward into the hammermill;
   pulverizing the clippings into a mulch with the hammermill; and
   discharging the mulch from the mower.

* * * * *